May 7, 1940.  W. CHRISTLEIN  2,200,157
HYDRAULIC TRANSMISSION GEAR
Filed Sept. 22, 1936   4 Sheets-Sheet 2

W. Christlein
Inventor

Glascock Downing & Seebold
Attys

May 7, 1940.   W. CHRISTLEIN   2,200,157
HYDRAULIC TRANSMISSION GEAR
Filed Sept. 22, 1936   4 Sheets-Sheet 3

W. Christlein
Inventor

May 7, 1940.  W. CHRISTLEIN  2,200,157
HYDRAULIC TRANSMISSION GEAR
Filed Sept. 22, 1936  4 Sheets-Sheet 4

Inventor:
W. Christlein
By Glascock Downing &Seebold
Attys

Patented May 7, 1940

2,200,157

UNITED STATES PATENT OFFICE 2,200,157

HYDRAULIC TRANSMISSION GEAR

Willy Christlein, Nuremberg, Germany

Application September 22, 1936, Serial No. 102,029
In Germany February 5, 1936

13 Claims. (Cl. 192—58)

This invention relates to hydraulic transmission gears of the type comprising a rotor housed in a casing and provided with vane pistons which co-operate with rotary abutments in the casing.

One object of the invention is to provide a hydraulic transmission gear of the type referred to, having relatively small dimensions and capable of transmitting considerable power, more particularly at high speeds. Another object of the invention is to provide a gear of the type referred to in which the transmission of power in the direct drive takes place practically without loss, and in which effective variation of the torque is possible within wide limits.

In the accompanying drawings various constructional examples of the hydraulic transmission gear according to the invention are shown.

Figures 1, 1A:
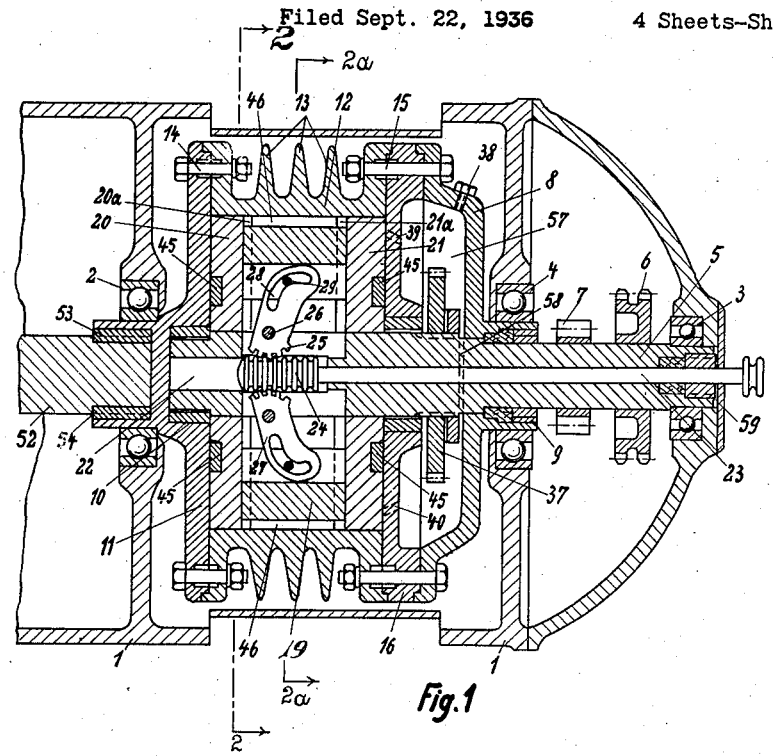
Figure 2:
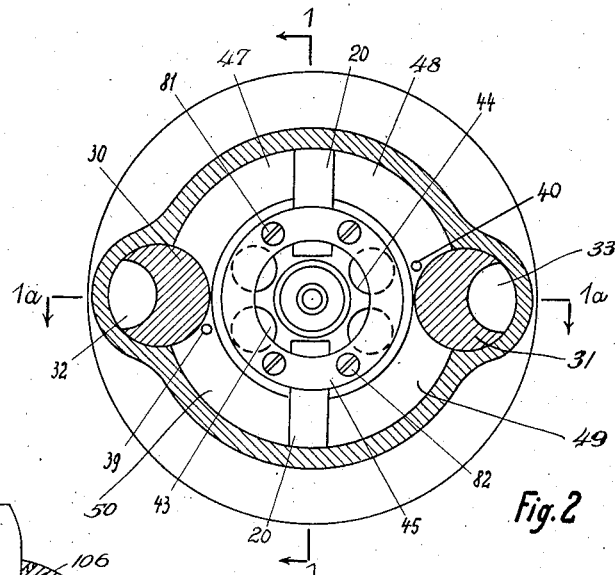
Figure 2A:
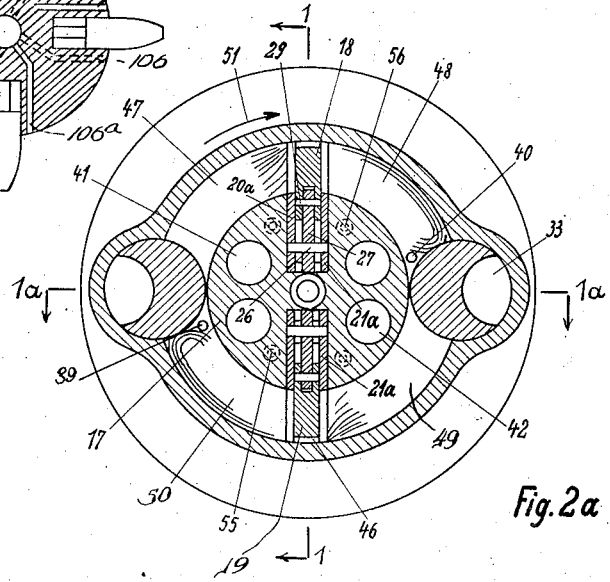

Fig. 1 is a vertical longitudinal section through one form of the gear on the line 1—1 of Fig. 2, Fig. 1a is a horizontal longitudinal section on the line 1a—1a of Fig. 2, Fig. 2 is a cross section on the line 2—2 of Fig. 1, showing the rotor in end elevation, and Fig. 2a is a similar cross-section but showing the rotor in section on the line 2a—2a.

Figure 5A:
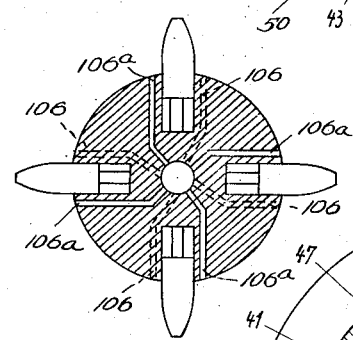
Figure 3:
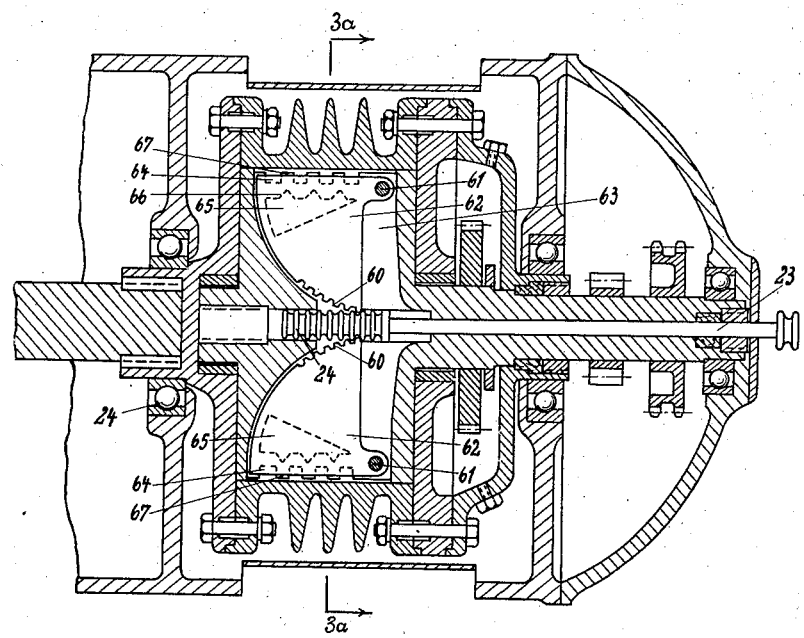
Figure 3A:
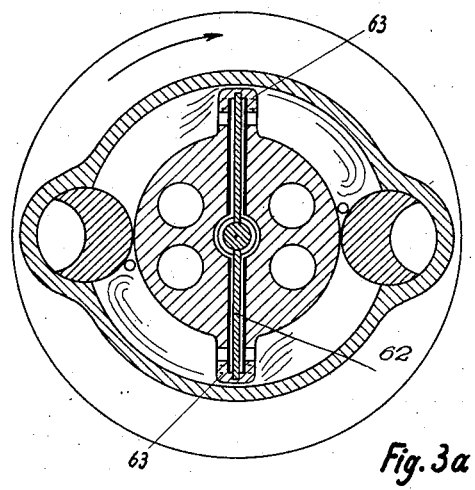
Figure 4:
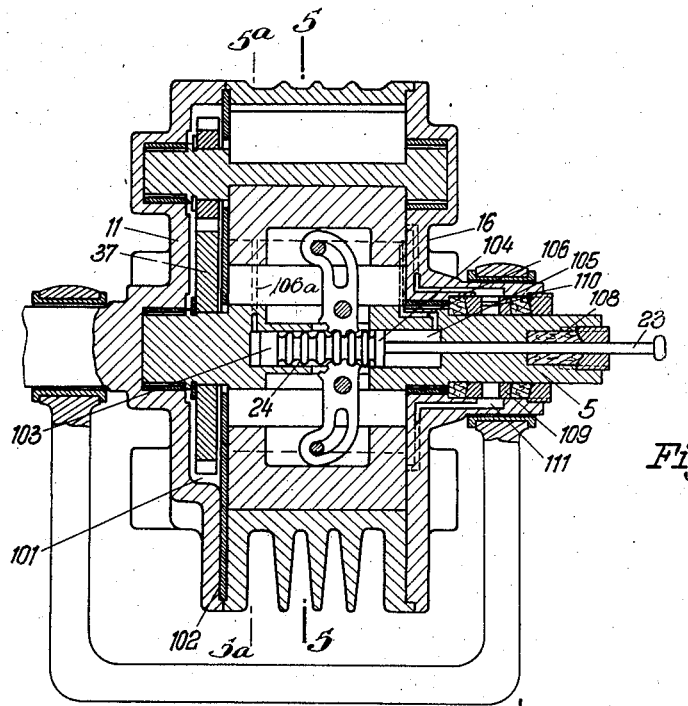
Figure 5:
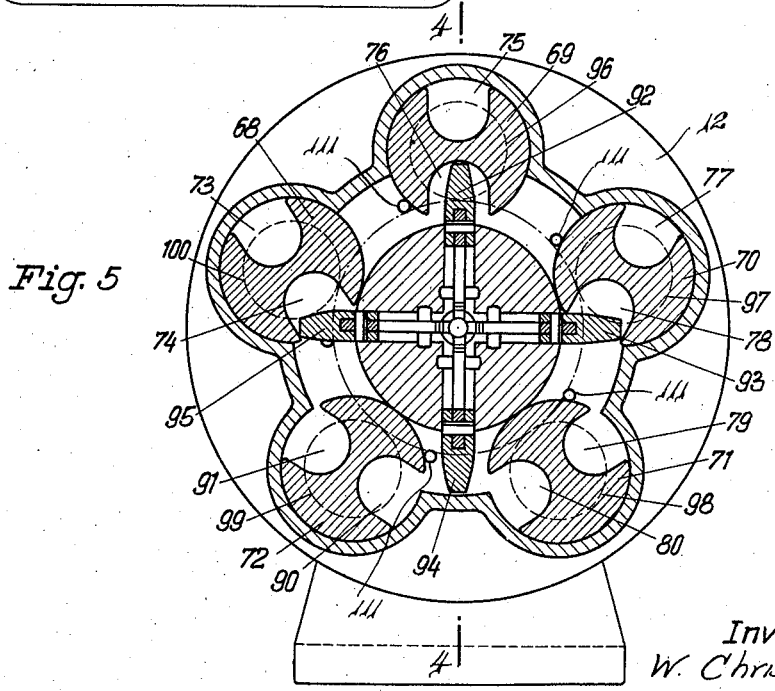

Fig. 3 is a part longitudinal section of another constructional form of the invention, Fig. 3a is a cross-section on the line 3a—3a of Fig. 3, Fig. 4 is a longitudinal section of a further modification on the line 4—4 of Fig. 5, Fig. 5 is a cross section on the line 5—5 of Fig. 4, Fig. 5a shows a cross-section of the rotor on the line 5a—5a of Fig. 4.

The gear shown in Figs. 1, 1a and 2, 2a is housed in a stationary housing 1 provide with bearings 2, 3 and 4. In the bearing 3 is journalled one end of the driven shaft 5 on which gear wheels 6, 7 are fixed. The driving shaft 52 has mounted on it a rotatable gear casing comprising two end covers 8, 11 and a body portion 12 provided with ribs 13, the end covers and body portion being bolted together by means of bolts 14, 15 and the cover 11 being keyed by means of keys 53, 54 on the driving shaft 52. The bolts 15 also secure in position an intermediate cover 16. The driven shaft passes through the end cover 8 of the gear casing at 9 and its other end is journalled in a bearing 10 in the other end cover 11 of the gear casing. The end covers 8, 11 are provided with trunnions by means of which they are journalled in the bearings 4 and 2, respectively.

On the shaft 5 is mounted the rotor 17 which is preferably integral with the shaft 5 and is provided with piston vanes comprising pairs of fixed end members 20, 21 and radially slidable vane members 18, 19 which are guided in the fixed end members 20, 21. The piston vanes co-operate with movable abutment members 30, 21 which are provided with sector-shaped recesses 32, 33 and are journalled at 34 and 35 in the end cover 11 and intermediate cover 16, respectively. The abutment members are at one end provided with journals which pass through the intermediate wall 16 and are provided with gear wheels 36 which mesh with a gear wheel 37 keyed on the shaft 5.

The slidable vane members 18, 19 are adjusted by means of a rod 23 which is slidable in an axial bore 22 in the shaft 5 and is provided at its inner end with circumferential ribs forming the teeth of a cylindrical rack 24 which engages the teeth of slotted lever members 27 which are pivotally mounted at 26 inside the rotor 17. The lever members 27 are provided with curved slots 28 and the slidable vane members with pins 29 which engage in said slots, so that on the rod 23 being moved inwardly the slidable vane members 18, 19 are retracted. The end members 20, 21 as shown in Fig. 1 are connected together by means of longitudinal walls 20a and 21a, respectively which carry the pivots 26 for the lever members 27 and the said walls are housed in radial slots in the rotor body, being secured in position radially and axially by means of rings 45 fixed on the ends of the rotor by means of screws 81, 82. By means of this construction, the gear is extremely easy to assemble, since the piston vanes together with the adjusting levers 27 can be inserted into the slots in the rotor and removed therefrom as units.

In the wall of the end cover 8 is an opening 38 for enabling oil to be introduced into the gear and the intermediate cover 16 is provided with openings 39, 40 through which the oil can pass into and out of the working chambers of the gear in the manner hereinafter described. The rotor is provided with recesses 41, 42, 43, 44 for the purpose of reducing its mass and for the storage of oil.

The hydraulic transmission gear shown in Figs. 1, 1a and 2, 2a operates as follows:

On the rod 23 being pulled out to the right in Fig. 1, 1a the lever members 27 will be rocked anti-clockwise, so that the pins 29 fixed in the sliding vane members 18, 19 travel along the curved slots 28 in such a manner that the tips of the sliding vane members become level with the outer edges of the end members 20, 21 and bear against the inner wall of the body portion 12. The gaps 46 shown in Fig. 1 between the tips of the sliding vane members and the inner wall of the body portion 12 of the gear casing are thereby closed. The working chambers 47, 48, 49, 50 formed between the piston vanes and the abutment members 30, 31 are filled with liquid, preferably oil. As this liquid is practically incompressible and non-expansive, on the gear casing being rotated by the driving shaft in the direction of the arrow 51 in Fig. 2, the rotor and the driven shaft will rotate in unison with it, since there is no outlet for the escape of liquid from the working chambers 47 and 49 and the liquid therein acts as substantially rigid thrust members between the abutments and the piston vanes. The driving and driven shafts are therefore rigidly connected together.

On the rod 23 being forced inwardly, the sliding vane members 18, 19 are drawn inwardly and gaps 46 are formed between the tips of the sliding vane members and the interior wall of the body portion 12 of the gear casing, through which the liquid in the working chambers 47, 49 can escape into the working chambers 48, 50, whereby the driving shaft and the gear casing rotates relatively to the rotor and the driven shaft and a partial vacuum is produced in the working chambers 48, 50. Owing to the pressure difference set up between the working chambers 47, 49 and 48, 50, liquid flows through the gaps 46 along the inner wall of the body portion 12 of the gear casing and impinges against the abutment members 30, 31 where it is deflected, thereby giving off energy again in the direction of rotation of the driving part of the gear.

Owing to the rotation of the casing 12 relatively to the rotor, the abutment members 30, 31 are rotated by means of the gear wheels 36, 37, so that as the piston vanes approach them the recesses of the abutments will face towards the interior of the casing and permit the piston vanes to pass into and out of the recesses 32, 33 as they move past the abutments. The amount of radial displacement of the slidable vane members 18, 19 can be varied as desired to vary the transmission ratio of the gear. The energy of the jets of liquid flowing through the gaps 46 has no external effect owing to the jets impinging on the abutment members and the corresponding pressure acting in the direction of flow in front of the piston vanes. The ratio of the area of the stationary end members of the piston vanes to the slidable members 18, 19 may be fixed to suit the required working conditions (speed control range, idle running etc.). Owing to the abutments being situated on the driving part of the gear and the direction of rotation of the abutments 30, 31 being such that any liquid imprisoned in the recesses is conveyed towards the pressure spaces 47, 49, there will be no losses due to transfer of liquid from the pressure spaces to the vacuum spaces through the abutments and owing to the internal construction of the gear which is similar to a roller bearing, very high working speeds are possible.

The slots 28 are of such a shape that at the commencement of the retraction of the vane members 18 the gap 46 opens more slowly than during the subsequent movement of the vane members so that accurate adjustment is possible. As the rod 23 is pushed further inwardly, the opening movement takes place with increasing rapidity until operative driving connection between the driving and driven parts ceases, which, for instance, in the case of motor vehicles enables the vehicle to be stopped or gear changing to be effected.

A further important advantage of this construction of the control means according to the invention is that the speed of revolution of the control rod 23 is completely independent of the speed of the other control parts and consequently of the speed of revolution of the gear, a factor which, at high speeds of revolution, is of particular importance for reliability of operation. Any desired number of sliding vane members can be operated by means of a single control rod, whereby the internal pressures in the gear can be kept comparatively low.

A further advantage of the invention is that the assembly of the gear is exceedingly simple. For this purpose, the members 20, 21 in which the lever members 27 are mounted are simply inserted in the corresponding slots in the rotor 17 after which the rings 45 are secured to the ends of the rotor by means of the screws 81, 82 which are screwed into holes 55, 56 in the ends of the rotor.

In order to ensure reliability in operation, it is necessary to provide efficient sealing means. According to the invention this is ensured by any liquid which leaks through the bearings of the abutments 30, 31 and of the rotor 17 collecting in the form of a fluid ring behind the cover 16 in the collecting space 57 formed between the covers 8 and 16. This fluid ring which is formed by centrifugal force covers the holes 39, 40 which establish communication between the space 57 and the vacuum spaces 48, 50 of the gear which are located behind the abutments 30, 31 in the direction of rotation of the gear. By means of this arrangement it is possible to relieve completely the stuffing box 9 which seals the space between the covers 8, 16 from the outside. A bore 58 leading from the rod 23 into the collecting space between the covers 8, 16 is provided in the rotor shaft 5 for the purpose of relieving the stuffing box 59.

In the direct drive adjustment of the gear, the gaps 46 are completely closed and the gear acts as a coupling with fluid cushions 47, 48, 49, 50. When operating with a step down in the transmission ratio, the gear casing 8, 11, 12 rotates more rapidly than the rotor 17, liquid flowing through the gaps 46 in the form of jets to an extent depending on the degree of reduction and after flowing along the inner wall of the body part 12 of the gear casing impinges on the abutments 30, 31. The energy of the liquid flowing through the gaps 46, which act as nozzle openings, is recovered as the jets impinge on and are deflected by the abutments 30, 31, the kinetic energy of the jets being converted into pressure energy which acts in such a manner as to produce a torque acting to increase the pressure in the pressure chambers 47, 49.

This novel mode of operation of the gear according to the present invention produces hydraulically a change in the driving torque of the gear, which is so constructed that the liquid flows always only in the direction of rotation and each nozzle member formed by the piston vanes 18, 19 and the inner wall of the casing part 12 is followed by a closure member in the form of a rotary abutment. It is necessary that in all positions of the driving part with respect to the driven part, the pressure spaces 47, 49 and the vacuum spaces 48, 50 be completely shut off from one another at the abutments, so that any return flow of fluid through the abutments is prevented by the abutments bearing in as fluid-tight a manner as possible on the rotor 17. By this means there is complete conversion of the energy of the liquid jets flowing in the same direction as the direction of rotation of the gear, the pressure and vacuum spaces being only in communication with one another through the gaps 46. Owing to the jets flowing through the gaps 46 being guided along the inner peripheral wall and side wall of the casing part 12, they are not disturbed by centrifugal force and the formation of eddies. During the passage of the piston vanes over the abutment members 30, 31 there will be no pronounced pressure spaces and vacuum spaces, and there will occur a sudden movement of the driving and driven parts with respect to one another which is particularly noticeable when air is contained in the liquid. Owing to the air being vented in the space 57, the occurrence of this sudden relative motion is no longer appreciable at high speeds of revolution.

In the modified form of gear shown in Fig. 3 and 3a, instead of the piston vane structure shown in Figs. 1 and 2, the rotor is provided with vane plates 63 having pivots 61 fixed thereon for arcuate plates 62 provided with gear teeth 60 which mesh with the teeth of the cylindrical rack 24 on the control rod 23. The plates 63 are provided with peripheral tooth-shaped gaps 64 and a triangular aperture 65 which is provided with upwardly extending triangular notches 66. The arcuate vane plates 62 which replace the vane members 18, 19 in Figs. 1 and 2, do not entirely close the gaps at their upper edges 67 when in their outermost position as shown in Fig. 3, so that the drive is transmitted elastically at all transmission ratios, including the direct drive and any shocks are particularly well cushioned. When the rod 23 is pulled outwardly, the arcuate vane plates 62 will be turned about their pivots 61 and will first uncover the toothed gaps 64. After the toothed gaps 64 have been completely uncovered the upper edges of the plates 62 will commence to uncover the notches 66 and will finally uncover the aperture 65 when the driving connection between the driving and driven parts will be practically interrupted. Except for the piston vane structure as above described, the constructional form of the gear shown in Fig. 3 is the same as that shown in Figs. 1 and 2.

In the modified constructional form of the gear shown in Figs. 4 and 5, five rotary abutments 68, 69, 70, 71, 72, are provided having pairs of recesses 73, 74, 75, 76, 77, 78, 79, 80, 90, 91. The rotor 17 is provided with four slidable vane members 92, 93, 94, 95 which are displaced radially in a similar manner to the vane members 18, 19 in Figs. 1 and 2, by means of a bar 23 with a cylindrical rack 24. The rotary abutments are driven by means of a gear wheel 37 fixed on the rotor shaft and meshing with gear wheels on the rotary abutments. The ratio of the diameters of the pitch circles 96, 97, 98, 99, 100 of the gear wheels on the rotary abutments to the diameter of the gear wheel 37 is such that the peripheral velocity of the rotary abutments differs from that of the rotor, being preferably higher than the rotor velocity, so that narrower recesses may be used. By making the rotary abutments of suitable diameter the recesses in the abutments and the parts of the piston vanes which co-operate therewith may be provided with tooth profiles. It has been found to be particularly advantageous to employ $n$ plus 1 piston vanes where $n$ equals the number of rotary abutments, as shown in Figs. 4 and 5, since by this means any jolts which may occur in the constructional form shown in Figs. 1 and 2 while the piston vanes are passing the abutments are avoided even at the lowest speeds of revolution. The rotary abutments 68, 69, 70, 71, 72 are journalled in the covers 11 and 16 of the gear casing. As the abutments are provided with pairs of recesses, the speed of revolution of the abutments is half that of abutments provided with only a single recess. The gear wheel 37 and the gear wheels on the rotary abutments are housed in a narrow space 101 in the cover 11 which is isolated from the working chambers of the gear by means of a separating disc 102 and is completely filled with liquid.

In Figs. 4 and 5 automatic control means for the slidable vane members are provided, pistons 103, 104 being provided at the ends of the cylindrical rack 24 on the control rod 23, the said pistons sliding in the cylindrical space 105. A passage 106 connects the low pressure or vacuum spaces of the gear to the right hand side of the cylindrical space 105 and another passage 106 connects the pressure space of the gear to the left hand side of the cylindrical space 105. Any increase in the load produces a corresponding resistance to motion of the driven part, namely the rotor 17, and an increase in the pressure difference between the pressure and vacuum space in the gear casing, whereby a higher pressure is caused to act on the piston 103 and a lower pressure on the piston 104, so that the rod 23 is displaced to the right and the sliding vane members 92, 93, 94, 95 are displaced inwardly by the cylindrical rack 24 and the levers 27, thereby reducing the pressure difference by allowing fluid to pass out of the pressure spaces into the vacuum spaces. On the load decreasing, the rotor 17 is caused to rotate more rapidly, whereby the centrifugal force acting on the vane members 92, 93, 94, 95 increases, so that the vane members are moved outwardly again and on the load decreasing to a sufficient extent the vanes will be forced into the extreme outward position and direct coupling will take place. By actuating the control rod 23 the transmission ratio can be varied at will which is necessary, more particularly for interrupting the driving connection between the driving and driven parts of the gear when it is desired to stop the driven member or for enabling other mechanical transmission gears to be put into and out of operation. The stuffing box packing 108 of the rod 23 is relieved of load, since the fluid is previously withdrawn by suction from the right-hand side of the cylinder space 105 through the passage 106. In the stuffing box 109 which seals the rotor shaft 5 with respect to the gear casing intermediate members with distancing parts 110 are provided, so that fluid which has leaked past the first packing part is drawn by suction through the passages 111 which lead to the vacuum spaces of the gear casing.

What I claim is:

1. A hydraulic power transmission gear, comprising in combination, a driving shaft, a driven shaft, a gear casing fixed on one of said shafts, a rotor rigid with the other shaft and enclosed in said gear casing, co-operating power transmitting elements mounted in said gear casing and on said rotor respectively and comprising a plurality of piston vane members and abutment members, the number of abutment members being at least equal to the number of piston vane members, said piston vane members dividing the space between the rotor and the inner peripheral wall of the gear casing into a plurality of working spaces, one set of said co-operating power transmitting elements being adjustable so as to enable the adjacent working spaces to be brought into and out of communication with one another and the power to be transmitted alternatively with transfer of fluid from one working space to the other and relative rotary motion between the driving and driven shafts or without transfer of fluid and relative rotary motion.

2. A hydraulic power transmission gear, comprising in combination, a driving shaft, a driven shaft, a gear casing fixed on one of said shafts, a rotor rigid with the other shaft and enclosed in said gear casing, co-operating power transmission elements mounted in said gear casing and on said rotor respectively and comprising a plurality of piston vane members and rotary abutment members having recesses therein for enabling the piston vane members to pass from one side of the abutments to the other and dividing the space between the rotor and the inner peripheral wall of the gear casing into a plurality of working spaces, the number of abutment members being at least equal to the number of piston vane members, said piston vane members being adjustable so as to enable the adjacent working spaces to be brought into and out of communication with one another and the power to be transmitted alternatively with transfer of fluid from one working space to the other and relative rotary motion between the driving and driven shafts or without transfer of fluid and relative rotary motion.

3. A hydraulic power transmission gear, comprising in combination, a driving shaft, a driven shaft, a gear casing fixed on one of said shafts, a rotor rigid with the other shaft and enclosed in said gear casing, a plurality of radially slidable piston vane members on said rotor, rotary abutment members in said casing having recesses therein for enabling the piston vane members to pass from one side of the abutment members to the other, the number of said abutment members being at least equal to the number of piston vane members and said piston vane members and abutment members dividing the space between the rotor and the inner peripheral wall of the gear casing into a plurality of working spaces, and means for adjusting the piston vane members so as to enable the adjacent working spaces to be brought into and out of communication with one another, and the power to be transmitted alternatively without transfer of fluid from one working space to the other and relative rotary motion between the driving and driven shafts and with relative rotary motion between the driving and driven shafts and transfer of fluid from one working space to the other between the inner peripheral wall of the gear casing and the tips of the piston vane members, said fluid flowing along the inner wall of the casing towards and impinging against the rotary abutment of the working space into which the fluid is transferred.

4. A hydraulic power transmission gear comprising the combination as set forth in claim 3 with a stuffing box interposed between the gear casing and the rotor shaft which is passed through it, said stuffing box having a collecting space in open communication with the working spaces into which the fluid is transferred during relative rotary motion between the driving and driven shafts, so as to enable any liquid leaking from the working spaces to be sucked back into the working spaces in communication with said collecting space.

5. A hydraulic power transmission gear, comprising the combination as set forth in claim 3 with an intermediate wall in the gear casing, one end of the rotor shaft being passed through said intermediate wall and an outer wall of the casing adjacent thereto, so as to form a collecting space for fluid which may leak from the working spaces, a stuffing box on said outer wall, the rotor shaft being passed through said stuffing box and said collecting space being in open communication with the working spaces into which the fluid is transferred during relative rotary motion between the driving and driven shafts, so as to enable any fluid leaking from the working spaces to be sucked back into the working spaces in communication with said collecting space.

6. A hydraulic power transmission gear, comprising the combination as set forth in claim 3 with an intermediate wall in the gear casing, one end of the rotor shaft being passed through said intermediate wall and an outer wall of the casing adjacent thereto, so as to form a collecting space for fluid which may leak from the working spaces, a stuffing box on said outer wall, the rotor shaft being passed through said stuffing box and said collecting space being in open communication with the working spaces into which the fluid is transferred during relative rotary motion between the driving and driven shafts, so as to enable any fluid leaking from the working spaces to be sucked back into the working spaces in communication with said collecting space, a gear wheel on the rotor shaft and gear wheels on the rotary abutments in mesh with the gear wheel on the rotor shaft, said gear wheels being housed in said collecting space.

7. A hydraulic power transmission gear, comprising in combination, a driving shaft, a driven shaft, a gear casing fixed to said driving shaft, a rotor rigid with the driven shaft and enclosed in said gear casing, a plurality of radially slidable piston vane members on said rotor, rotary abutment members in said casing having recesses therein for enabling the piston vane members to pass from one side of the abutment members to the other, the number of said abutment members being at least equal to the number of piston vane members and said piston vane members and abutment members dividing the space between the rotor and the inner peripheral wall of the gear casing into a plurality of working spaces, and means for adjusting the piston vane members so as to enable the adjacent working spaces to be brought into and out of communication with one another and the power to be transmitted alternatively without transfer of fluid from one working space to the other and relative rotary motion between the driving and driven shafts and with relative rotary motion between the driving and driven shafts and transfer of fluid from one working space to the other between the inner peripheral wall of the gear casing and the tips of the piston vane members, said adjusting means including an adjusting rod having pistons thereon, and the rotor shaft having a cylindrical space therein for housing said pistons and conduits connected to said cylindrical space and to the working spaces of the gear, so as to expose the one piston to the pressure in the working spaces to which the fluid is transferred during relative rotary motion between the gear casing and the rotor, and expose the other piston to the pressure in the other working spaces, said pistons arranged to act in opposition to one another for automatically adjusting the setting of the piston vane members.

8. A hydraulic power transmission gear, comprising the combination as set forth in claim 3, with actuating means for adjusting the piston vane members, and comprising an actuating rod passed through the rotor shaft having rack teeth thereon, actuating levers pivoted in the rotor and having gear teeth thereon meshing with the rack teeth on the actuating rod, said actuating levers having curved slots therein and pins on the piston vane members in engagement with said slots.

9. A hydraulic power transmission gear, comprising in combination, a driving shaft, a driven shaft, a gear casing fixed to said driving shaft, a rotor rigid with the driven shaft and enclosed in said gear casing, a plurality of piston vane members pivoted on the rotor so as to be displaceable radially in axial planes on said rotor, rotary abutment members in said casing having recesses therein for enabling the piston vane members to pass from one side of the abutment members to the other, the number of said abutment members being at least equal to the number of piston vane members and said piston vane members and abutment members dividing the space between the rotor and the inner peripheral wall of the gear casing into a plurality of working spaces, and means for adjusting the piston vane members so as to enable the adjacent working spaces to be brought into and out of communication with one another, and the power to be transmitted alternatively without transfer of fluid from one working space to the other and relative rotary motion between the driving and driven shafts and with relative rotary motion between the driving and driven shafts and transfer of fluid from one working space to the other, and actuating means connected to said piston vane members for effecting displacement thereof in said axial planes.

10. A hydraulic power transmission gear, comprising in combination, a driving shaft, a driven shaft, a gear casing fixed on the driving shaft, a rotor rigid with the driven shaft and enclosed in said gear casing, a plurality of piston vane members pivoted on said rotor so as to be capable of rotary adjustment in radial planes extending axially of the driven shaft, rotary abutment members in said casing having recesses therein for enabling the piston vane members to pass from one side of the abutment members to the other, the number of said abutment members being at least equal to the number of piston vane members and said piston vane members and abutment members dividing the space between the rotor and the inner peripheral wall of the casing into a plurality of working spaces and means for adjusting the piston vane members so as to enable the adjacent working spaces to be brought into and out of communication with one another and the power to be transmitted alternatively without transfer of fluid from one working space to the other and relative rotary motion between the driving and driven shafts and with relative rotary motion between the driving and driven shafts and transfer of fluid from one working space to the other between the inner peripheral wall of the gear casing and the piston vane members, said adjusting means comprising an actuating rod slidable axially in the rotor shaft and having rack teeth thereon and gear teeth on the pivoted piston vane members meshing with said rack teeth so as to turn the piston vane members on the actuating rod being displaced axially.

11. A hydraulic power transmission gear, comprising the combination as set forth in claim 3 with adjusting means for the piston vane members, comprising an actuating rod slidable axially in the driven shaft and having rack teeth thereon, actuating levers pivoted in the rotor and having curved slots therein and having gear teeth thereon meshing with the rack teeth on the actuating rod and pins on the piston vane members in engagement with said slots, the curvature of said slots increasing in steepness towards the centre of the rotor so as to produce an acceleration of the movement of the piston vane members as the latter move inwardly towards the axis of the gear.

12. A hydraulic transmission gear, comprising in combination, a rotor casing and a rotor inside said rotor casing, one of said members constituting the driving element of the gear and the other the driven element of the gear, a plurality of rotary abutment members on the driving element spaced circumferentially inside the rotor casing, so as to subdivide the space between the rotor and the rotor casing into a plurality of compartments, and a plurality of piston vane members on the driven element, the number of said piston vane members not exceeding the number of rotary abutment members, so as to divide said compartments into adjacent pressure and suction spaces alternating around the periphery of the rotor, said piston vane members being adjustable from a closed position for operating the gear without transfer of fluid from the pressure spaces to the suction spaces into a variably open position, so as to enable the gear to operate with variable fluid transfer from the pressure spaces to the suction spaces and more or less relative motion between the driving and driven elements of the gear.

13. A hydraulic transmission gear comprising the combination as set forth in claim 2, with means for adjusting the piston vane members including an actuating rod passed through the rotor shaft, with a stuffing box for sealing the said actuating rod with respect to the outside and a conduit in open communication with the working spaces into which the fluid is transferred during relative rotation between the driving and driven shafts, said conduit extending to said actuating rod so as to enable any fluid leaking along the actuating rod to be sucked back to said working spaces.

WILLY CHRISTLEIN.